UNITED STATES PATENT OFFICE.

WALLACE S. CHASE, OF LAKEWOOD, OHIO, ASSIGNOR, BY MESNE ASSIGNMENTS, TO NATIONAL CARBON COMPANY, INC., A CORPORATION OF NEW YORK.

PROCESS OF OBTAINING FLUORID PRECIPITATES.

1,314,571.   Specification of Letters Patent.   Patented Sept. 2, 1919.

No Drawing.   Application filed January 31, 1916.   Serial No. 75,249.

*To all whom it may concern:*

Be it known that I, WALLACE S. CHASE, a subject of the King of Great Britain, residing at Lakewood, in the county of Cuyahoga and State of Ohio, have invented a certain new and useful Improvement in Processes of Obtaining Fluorid Precipitates, of which the following is a full, clear, and exact description.

This invention relates to processes for producing fluorids of the rare-earth metals and of calcium.

Fluorids of the rare-earth metals are produced by precipitation from a solution containing certain of their salts, *e. g.* sulfates, by means of hydrofluoric acid or its equivalent. The precipitate when obtained in this way is in the form of a slimy mass that settles slowly and can be neither washed nor filtered.

I have found that the fluorids of the rare-earth metals can be precipitated in powder form if the concentration of the fluorid ions is exceedingly low, so that the speed of reaction is very much reduced. The best way to do this is to use a fluorin containing compound that is readily soluble, but which dissociates with formation of fluorid ions only to a slight degree. These seemingly paradoxical requirements are admirably fulfilled by complex fluorin compounds, such as hydro-fluo-boric acid of which $HBF_4$ is a typical example, although there are many others of different formula.

The hydrofluo-boric acid may be made by dissolving ortho boric acid in hydrofluoric acid solution which should be kept cool in any suitable way. Theoretical quantities of the materials should be used and the resultant product then contains substantially nothing but hydrofluoboric acid and water. The reaction may be represented by the following equation:—

$$H_3BO_3 + 4HF = HBF_4 + 3H_2O.$$

To bring about the reaction I place oxids of the rare-earth metals in a receptacle and add a solution of a complex fluorin compound, such as $HBF_4$ mentioned above, and stir the mixture to facilitate complete reaction. The hydro-fluo-boric acid solution has a feeble concentration of fluorid ions and reaction between such and the oxid is slow in comparison with the usual process. To facilitate the reaction the contents of the container are heated to a temperature preferably between 80° C. and 90° C., although this is deemed advisable only from a practical view point. The reactions taking place can be represented by the following equations:—

$$REO_2 + 4HBF_4 = REF_4 + 2H_2O + 4BF_3;$$

or $$RE_2O_3 + 6HBF_4 = 2REF_3 + 3H_2O + 6BF_3;$$
$$2BF_3 + 4H_2O = H_2B_2O_4 6.HF;$$
$$RE_2O_3 + H_2O + 2HBF_4 =$$
$$2REF_3 + H_2B_2O_4 + 2HF.$$

The meta-boric acid in the last equation will combine with more or less of the hydrofluoric acid in accordance with the following equation:

$$H_2B_2O_4 + xHF = H_2B_2O_4.xHF.$$

Fluorids prepared in the above way are in the form of a light buff colored powder which settles immediately and can be readily filtered and washed. The washing can be carried out in any way, such as by decantation, and the precipitate filtered in a filter press or in any other known way.

The precipitate produced by my improved process also has the advantage that it can be calcined to as high as 650° C. or higher, without caking or agglomerating into granules. Calcination changes its color to a pure white, but it is still in powder form which makes it easy to handle in subsequent operations as no grinding is necessary.

The process also produces a product that has a much higher fluorin content than can be produced by any prior processes of which I am aware. In fact, it is practical to prepare chemically pure fluorids of the rare-earth metals containing the theoretical amount of fluorin.

An added advantage of this process is that, owing to the rare-earth base being the carbonate or oxid, no trouble is experienced from occluded salts of rare-earth metals, as is the case where the fluorids are made from the sulfates or chlorids of the rare-earth metals.

Having described my invention, what I claim is:—

1. The process of precipitating fluorids of the rare-earth metals, which consists in adding to compounds of the rare-earth metals in the presence of water a soluble complex boro-fluorin compound capable of only slight dissociation into fluorin ions.

2. The process of preparing fluorids of the rare-earth metals, which consists in adding a complex boro-fluorin compound to oxids of said rare-earth metals in the presence of water, filtering the resultant precipitate and washing it to remove soluble impurities.

3. The process of preparing fluorids of the rare-earth metals which consists in bringing together the oxids of said metals and a solution of hydrofluo-boric acid to produce a powdery precipitate of said fluorids.

In testimony whereof, I hereunto affix my signature.

WALLACE S. CHASE.

Copies of this patent may be obtained for five cents each, by addressing the "Commissioner of Patents, Washington, D. C."